United States Patent [19]
Gehman et al.

[11] Patent Number: 6,007,142
[45] Date of Patent: Dec. 28, 1999

[54] FOLDING TRAILER WITH EXTENDABLE ROOM

[75] Inventors: Dana K. Gehman, Somerset; David R. Turner, Milford Township, Somerset County, both of Pa.

[73] Assignee: Fleetwood Folding Trailers, Inc., Somerset, Pa.

[21] Appl. No.: 09/109,432

[22] Filed: Jul. 2, 1998

Related U.S. Application Data

[60] Provisional application No. 60/051,627, Jul. 3, 1997.

[51] Int. Cl.⁶ .................................................. B60R 3/355
[52] U.S. Cl. ...................... 296/171; 296/26.13; 296/170; 296/173
[58] Field of Search ............................. 296/26.12, 26.13, 296/165, 170, 171, 173, 175

[56] References Cited

U.S. PATENT DOCUMENTS

| | | | |
|---|---|---|---|
| 3,941,414 | 3/1976 | Platt | 296/23 |
| 4,049,310 | 9/1977 | Yoder | 296/26 |
| 4,480,866 | 11/1984 | Komatsu | 296/21 |
| 4,500,132 | 2/1985 | Yoder | 296/171 |
| 4,930,837 | 6/1990 | Marsh et al. | 296/165 |
| 5,154,469 | 10/1992 | Morrow | 296/26 |
| 5,237,782 | 8/1993 | Cooper | 52/67 |
| 5,280,687 | 1/1994 | Boiteau | 52/67 |
| 5,567,003 | 10/1996 | Gill | 296/173 |

FOREIGN PATENT DOCUMENTS

| | | | |
|---|---|---|---|
| 925908 | 5/1973 | Canada | 296/171 |
| 1570553 | 6/1969 | France | 296/26.13 |
| 1092318 | 11/1960 | Germany | 296/171 |
| 2026360 | 12/1971 | Germany | 296/171 |

*Primary Examiner*—D. Glenn Dayoan
*Assistant Examiner*—Paul Chenevert
*Attorney, Agent, or Firm*—Webb Ziesenheim Logsdon Orkin & Hanson, P.C.

[57] ABSTRACT

A folding trailer which includes a slide-out room movable from a retracted position within the trailer to an extended position which adds additional living space to the inside of the trailer. The slide-out room includes a front wall, a rear wall and an exterior wall, with the floor attached therebetween and spaced above the trailer floor. A pair of lateral roller supports attached to the trailer floor along the front wall engages a roller track attached to the inside surface of the front wall. Similarly, a pair of lateral roller supports attached to the trailer floor on the other side of the slide-out room, and adjacent the rear wall, engages a roller track on an inner surface of the rear wall. A plurality of vertical roller supports attached to the trailer floor supports and contacts the lower surface of the slide-out floor. A catch clip attached to the lower surface of the slide-out floor near each corner thereof and adjacent the interior end of the slide-out room opposite the exterior wall functions to engage the innermost lateral roller supports and stop the slide-out room from moving further out from the main body of the trailer.

21 Claims, 17 Drawing Sheets

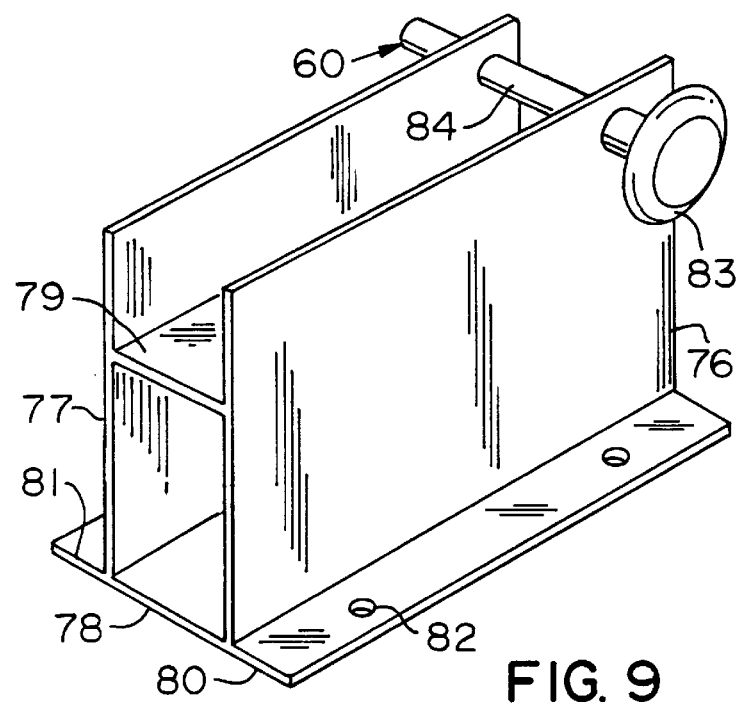
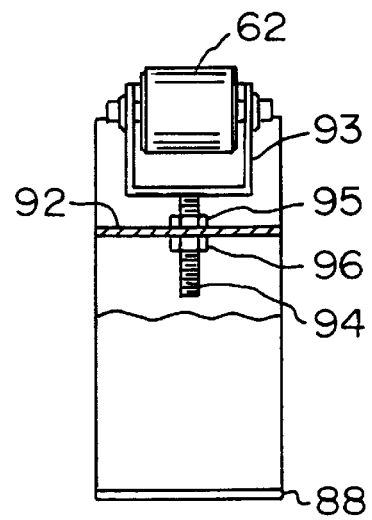
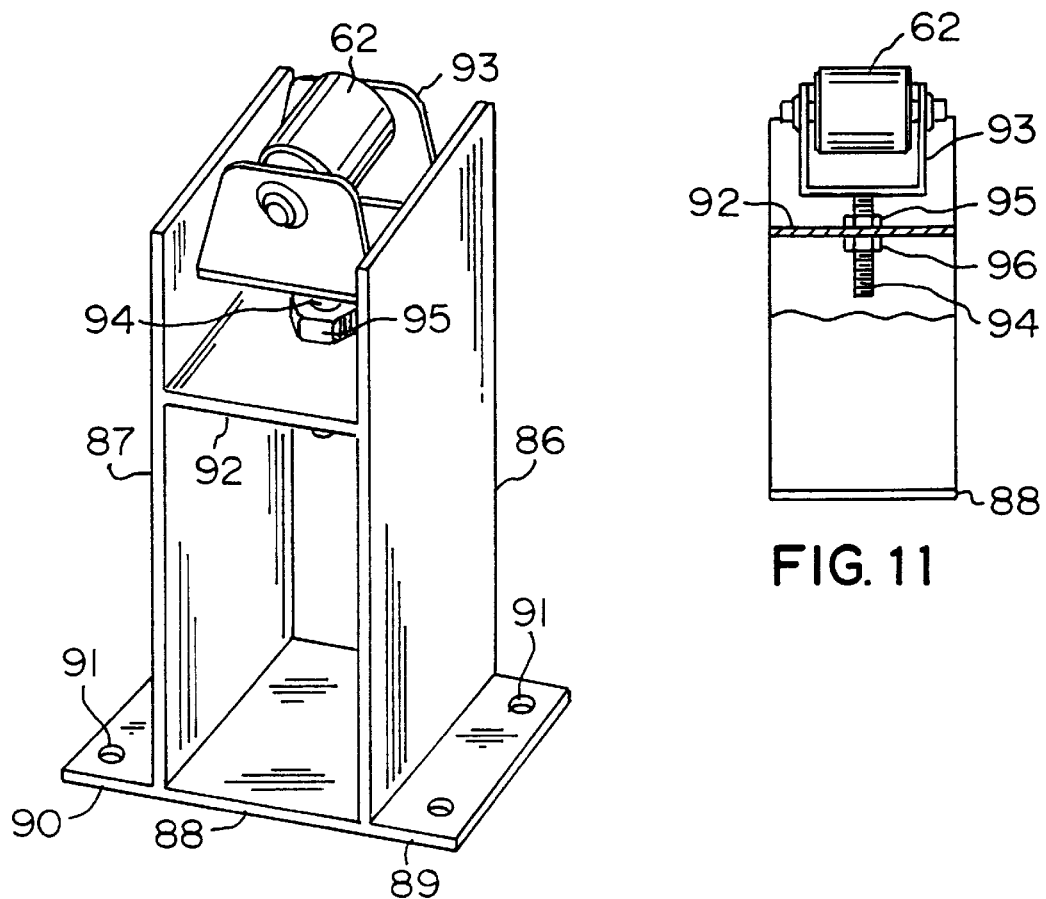

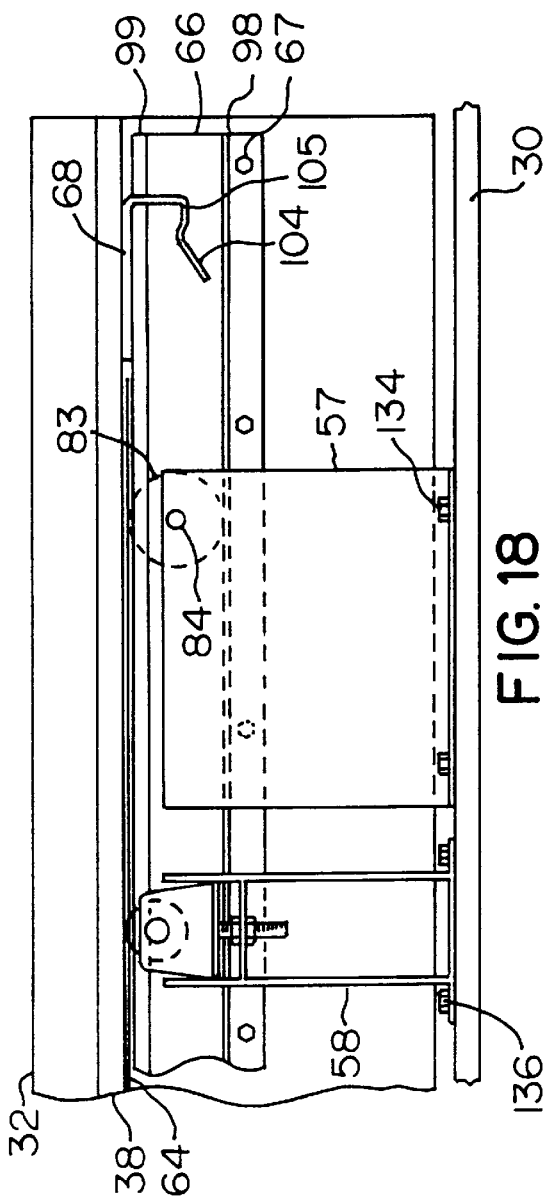
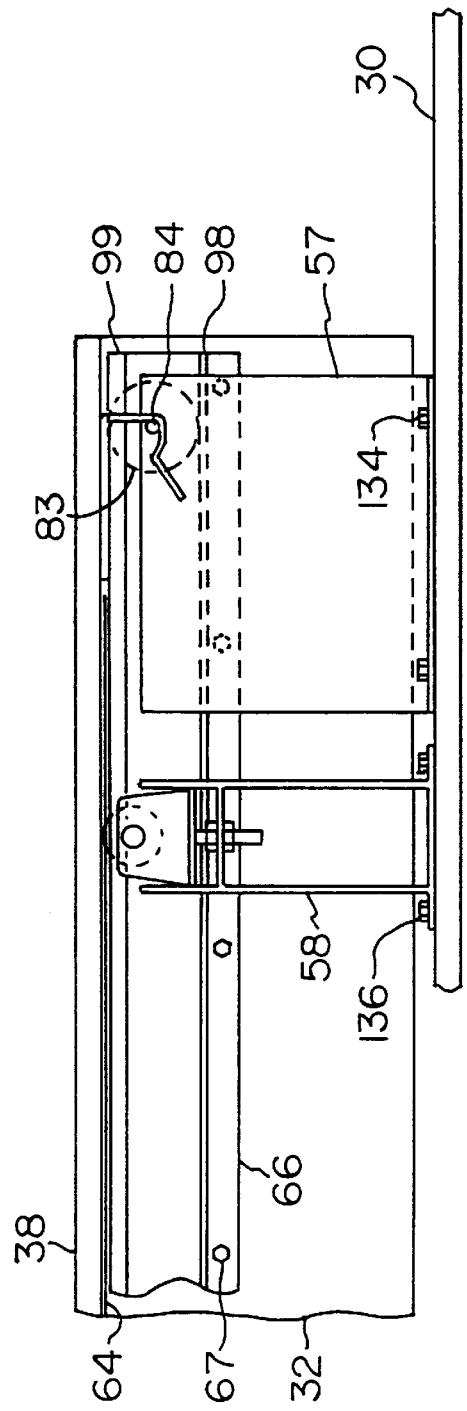

FOLDING TRAILER WITH EXTENDABLE ROOM

CROSS-REFERENCE TO RELATED APPLICATION

This application claims the benefit of U.S. Provisional Patent Application Ser. No. 60/051,627 filed Jul. 3, 1997, entitled "Folding Trailer With Extendable Room".

BACKGROUND OF THE INVENTION

1) Field of the Invention

This invention relates to the camping area and, in particular, to folding trailers with an extendable room.

2) Description of the Prior Art

The use of camping trailers and recreational vehicles is well known and continues in its popularity today. Recreational vehicles are driven down the road in a self-contained unit and camping trailers are towed behind a car or other towing vehicle. Due to road limitations and the like, the width of recreational vehicles and camping trailers is restricted to certain maximums when the unit is traveling down the road. One solution for adding width to a recreational vehicle or camping trailer when set up at a campsite is to provide one or more slide-outs or movable rooms which can be extended laterally outwardly from the unit and then moved back into one or both sides thereof. Examples of prior art units including a slide-out or movable room are shown in U.S. Pat. Nos. 3,941,414; 4,049,310; 4,480,866; 4,500,132; 4,930,837; 5,154,469; 5,237,782; and 5,280,687.

The use of a laterally movable slide-out room is also known in connection with a tent camper or folding trailer as shown in U.S. Pat. No. 5,567,003 to Gill. However, the particular slide-out structure shown in the Gill patent has a number of deficiencies which make it not suited for the environments in which tent campers are typically used. The arrangement shown in the Gill patent utilizes a pair of guide tubes that are attached under the chassis or framework of the trailer. Each tube carries a horizontally disposed support shaft that is attached at one end to the slide-out and which provides straight line guidance for lateral motion of the slide-out and provides support until the slide-out can be stabilized in its final position. A problem with this arrangement is that the tubes and support shafts are totally exposed and are vulnerable to damage from rocks and other road hazards which would render the slide-out difficult or impossible to operate. The support shafts must also be heavily lubricated and will likely need constant attention to maintain adequate lubricity. In addition, when the slide-out is in the extended position, the greased areas on the support shafts are exposed to damage and dirt. In fact, the axle grease on the support shafts acts like a magnet, attracting dirt and road grime that will eventually cause binding and difficulty in operation. With the arrangement in the Gill patent, there is a serious risk that the slide-out mechanism (tubes and support shafts) would be bent or otherwise damaged either when the trailer is in the folded position, and then the slide-out could not be extended, or when the trailer is in the extended position, and then the slide-out could not be retracted back into the trailer and the trailer could not be further moved. In addition, separate stabilizer bars are needed at the outer edges of the slide-out to provide adequate support. If the slide-out is not equally stabilized in the extended position, the slide-out mechanism could bind in the extended position. Moreover, in the arrangement shown in the Gill patent, roller wheels are provided on the bottom of the slide-out and directly engage the floor of the trailer. These roller wheels tend to leave impressions on the trailer floor and scratch, crease or crack the floor when the slide-out is moved into and out of the trailer. Furthermore, the design of the Gill patent requires a large pulling force to extend the slide-out from the trailer and a large pushing force to retract the slide-out back into the trailer.

SUMMARY OF THE INVENTION

The present invention overcomes all of the deficiencies of the arrangement shown in the Gill patent. A slide-out or extendable room is provided in a folding trailer which has its moving and support mechanism totally located inside the trailer, between the trailer floor and the inside of the floor of the slide-out. No portion of the moving and support mechanism is provided below the trailer floor or in an area which is subject to damage or exposure that would render the mechanism inoperative. While the slide-out is structurally connected to the floor of the trailer and, consequently, to the trailer frame, the slide-out in the present invention does not ride at all on the trailer floor but rides above the trailer floor and entirely on the internally contained mechanisms designed specifically for the slide-out. In addition, no separate stabilizers or supports are required to hold the slide-out when it is in its extended position. Although we intend that our slide-out room would be usable in a folding trailer having longitudinally extending beds, with the slide-out room movable in a lateral direction, our design can be used in a folding trailer that has no extendable beds and/or can be extendable in a longitudinal direction.

Accordingly, we have developed a folding trailer with a slide-out or extendable room that includes a trailer body supported by a framework and having a floor therein and a roof aligned above the trailer body and movable between a closed position adjacent the trailer body and an opened position raised above the trailer body. The extendable room is positioned above and spaced from the trailer floor and is movable between a closed position retracted within the trailer body and an opened position extending outwardly beyond the trailer body. The extendable room includes a floor spaced above the trailer floor. A flexible enclosure extends between the raised roof, the trailer body and the extendable room and forms an enclosed trailer space with the roof, the trailer body and the extendable room. A slide mechanism slidably attaches the extendable room to the trailer body. The slide mechanism includes a track mechanism attached to either the trailer floor or the extendable room and extends along the direction of movement of the extendable room. A roller mechanism is attached to the other of the trailer floor and the extendable room and engages the track mechanism. The slide mechanism is located on or beneath the floor of the extendable room as well as on or above the trailer floor when the extendable room is in both the closed and the opened positions. In this arrangement, no portion of the slide mechanism extends beyond the extendable room and into an interior area of the trailer body when the extendable room is in both the closed and the opened positions.

In a preferred embodiment, the extendable room includes a front wall, a rear wall and an exterior wall forming a box-like structure, with the floor of the extendable room attached thereto, and with the slide mechanism located on or between the front wall, rear wall and floor of the extendable room. Furthermore, the track mechanism includes a first roller track on an inside surface of the front wall and a second roller track on an inside surface of the rear wall, with the first and second roller tracks located below the extendable room floor. In addition, the roller mechanism includes at least one, and preferably two lateral roller supports attached to the trailer floor adjacent the first roller track and each having a lateral roller which engages the first roller track, as well as at least one, and preferably two lateral roller supports attached to the trailer floor adjacent the second roller track and each having a lateral roller which engages the second roller track.

Additionally, in a preferred embodiment, the folding trailer includes a plurality of vertical roller supports attached to the trailer floor and positioned beneath the floor of the extendable room and within the front and rear walls of the extendable room, as well as positioned within that portion of the trailer floor which is beneath the floor of the extendable room when it is in the opened position. The vertical roller supports each include a vertical roller which contacts and supports a lower surface of the floor of the extendable room. The vertical roller supports preferably include an adjustment mechanism for adjusting the vertical position of the vertical roller.

In a preferred embodiment, the folding trailer also includes at least one catch clip attached to a lower surface of the floor of the extendable room and adjacent an interior edge opposite the exterior wall. The catch clip is configured to engage one adjacent lateral roller support and stop the outward movement of the extendable room when it is moved from the closed position to the opened position. Preferably, the folding trailer includes two such catch clips, one positioned against each of the first and second roller tracks and adjacent the innermost of the lateral roller supports, respectively.

BRIEF DESCRIPTION OF THE DRAWINGS

FIG. 9 is a perspective view of the lateral roller support shown in FIG. 5;

FIG. 10 is a perspective view of the vertical roller support shown in FIG. 5;

FIG. 11 is a side view, partially broken away, of the vertical roller support shown in FIG. 10;

FIG. 18 is a side view of the portion of the slide-out shown in FIGS. 14 and 16;

FIG. 19 is a side view of the portion of the slide-out shown in FIGS. 15 and 17;

DESCRIPTION OF THE PREFERRED EMBODIMENTS

Figure 1:
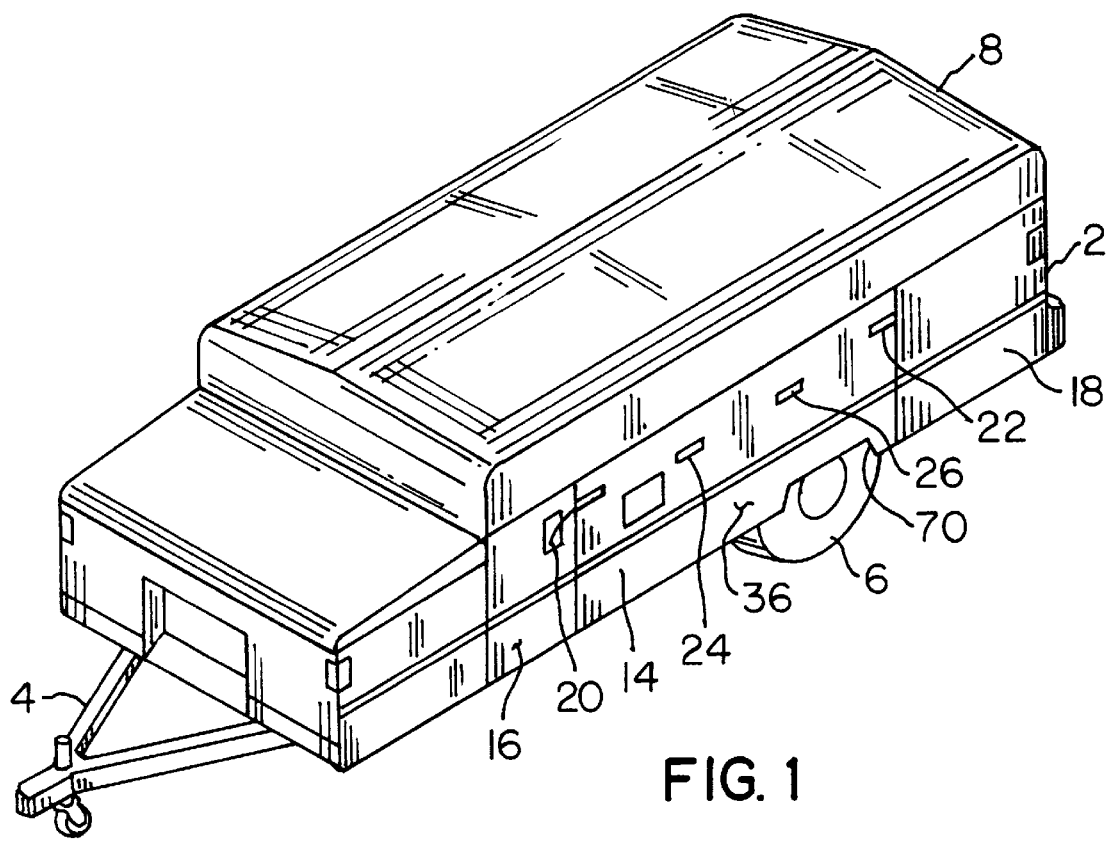
FIG. 1 is a perspective view of a folding trailer with an extendable room, in accordance with the present invention, in the folded or closed position.
Figure 2:
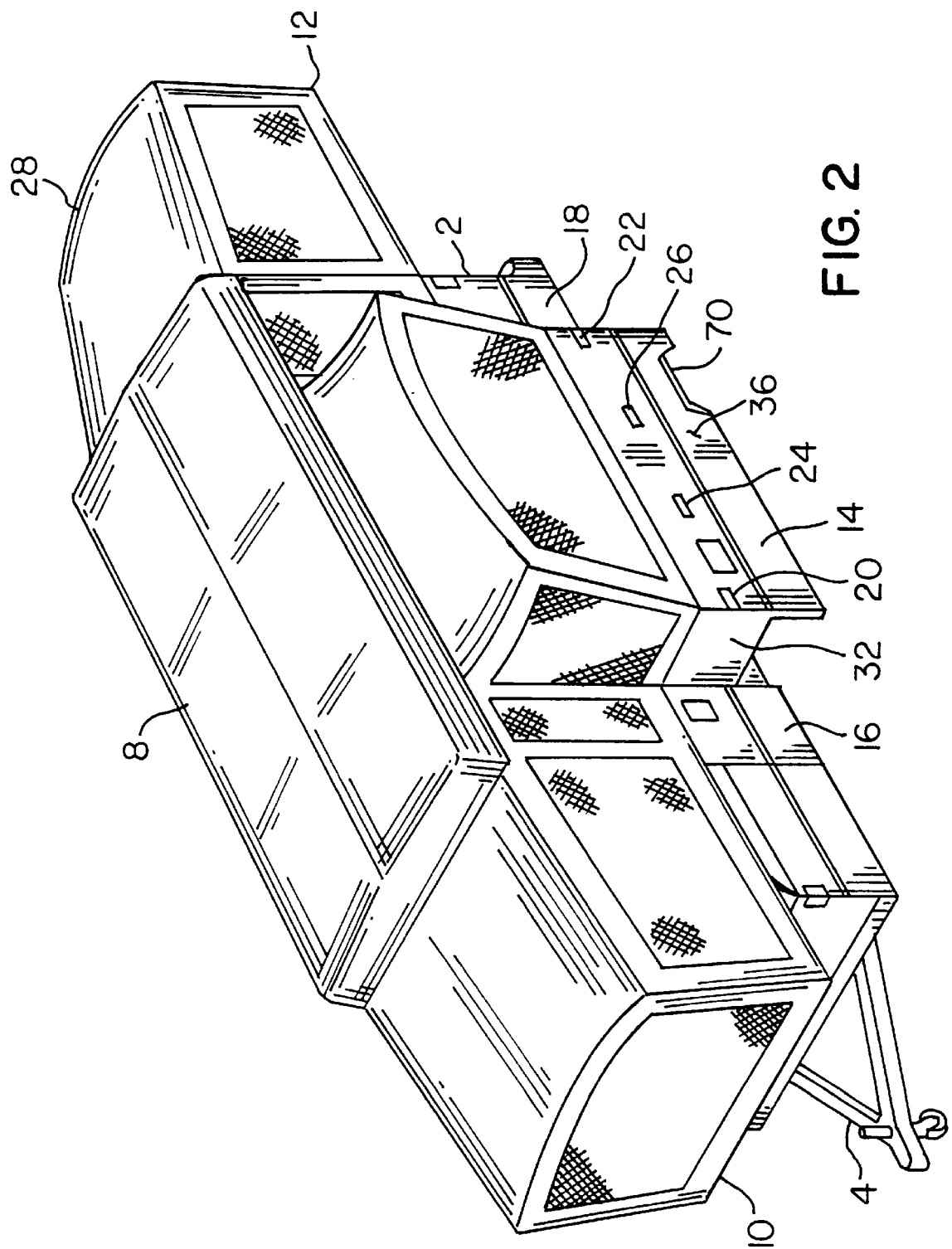
FIG. 2 is a perspective view of the folding trailer shown in FIG. 1 in the extended or opened position.

FIGS. 1 and 2 show one embodiment of a folding trailer having an extendable room or slide-out in accordance with the present invention. The folding trailer is shown in its closed or folded position in FIG. 1 and in its opened or extended position in FIG. 2.

The trailer generally has a trailer body 2 which is attached to a supporting framework 4 and which rides on wheels 6 attached to the framework 4. A roof 8 is provided above the trailer body 2 and can be raised from the closed position shown in FIG. 1 to the raised position shown in FIG. 2 by means of a lifting mechanism or the like as is well known in the art. Once the roof 8 is lifted to the raised position, beds 10 and 12 on opposite ends of the trailer are extended and a slide-out 14 in accordance with the present invention is moved out laterally from one side of the trailer. The slide-out 14 is positioned along one side of the trailer, shown on the left side in FIGS. 1 and 2 and between a front portion 16 of a left side wall and a rear portion 18 of the left side wall. In order to move the slide-out 14 from the trailer body 2 after the roof 8 has been raised, latches 20 and 22 on opposite sides thereof are opened, which unlock the slide-out 14 from the trailer body 2, handles 24 and 26 are grasped and the slide-out 14 is pulled outwardly from the trailer body 2. Once the beds 10 and 12 and slide-out 14 are in the fully extended position, an internal framework supporting canvas 28 connected between the roof 8 and the trailer body 2, the extendable beds 10, 12 and the slide-out 14 is extended and locked in place to provide the configuration shown in FIG. 2. The steps discussed above are reversed to place the trailer back in the closed configuration shown in FIG. 1. The canvas 28 forms a flexible enclosure which forms an enclosed trailer space with the trailer body 2, roof 8, beds 10 and 12 and slide-out 14.

Figure 3:
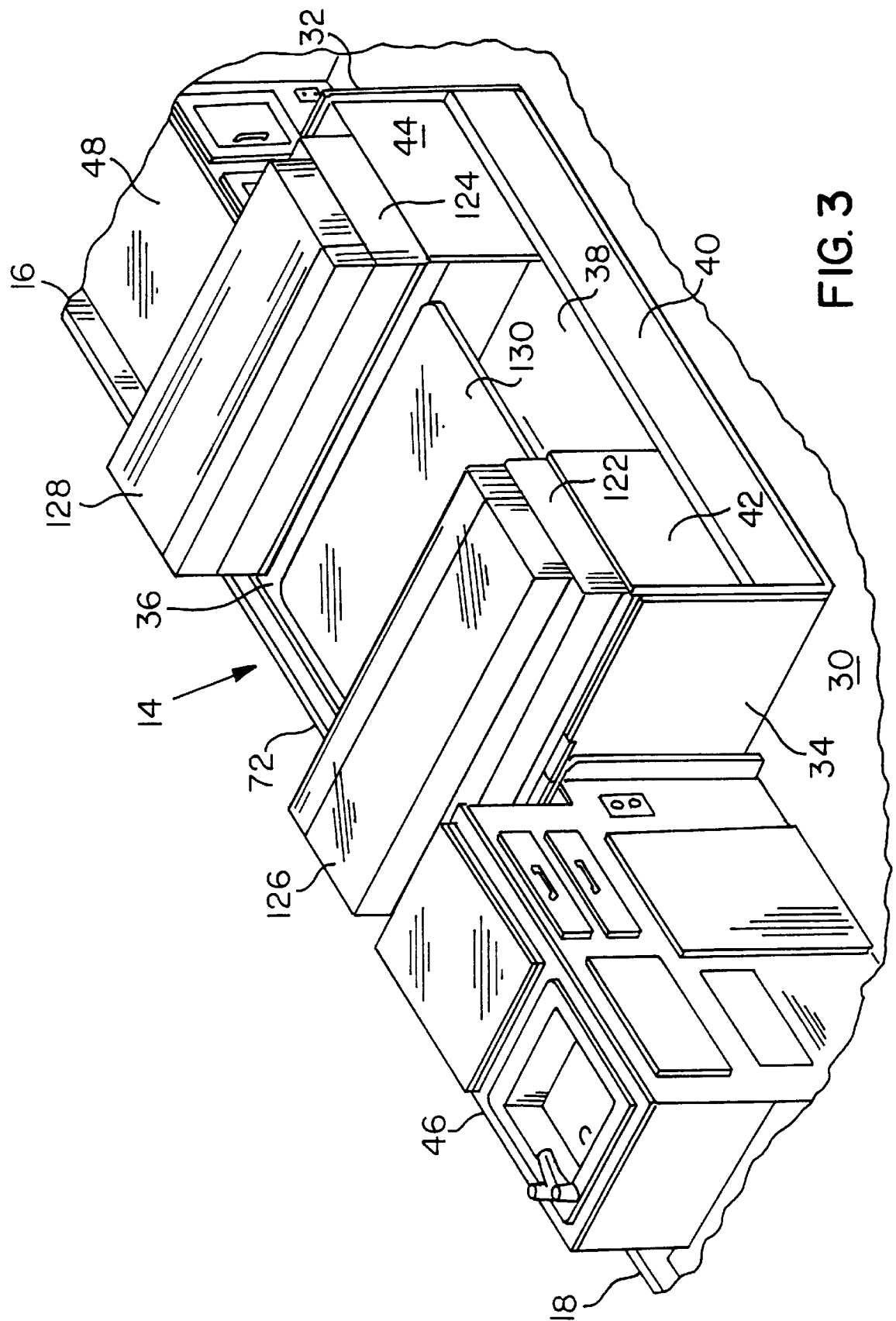
FIG. 3 is a perspective view of a portion of the folding trailer shown in FIG. 1 with the slide-out in the retracted position.
Figure 4:
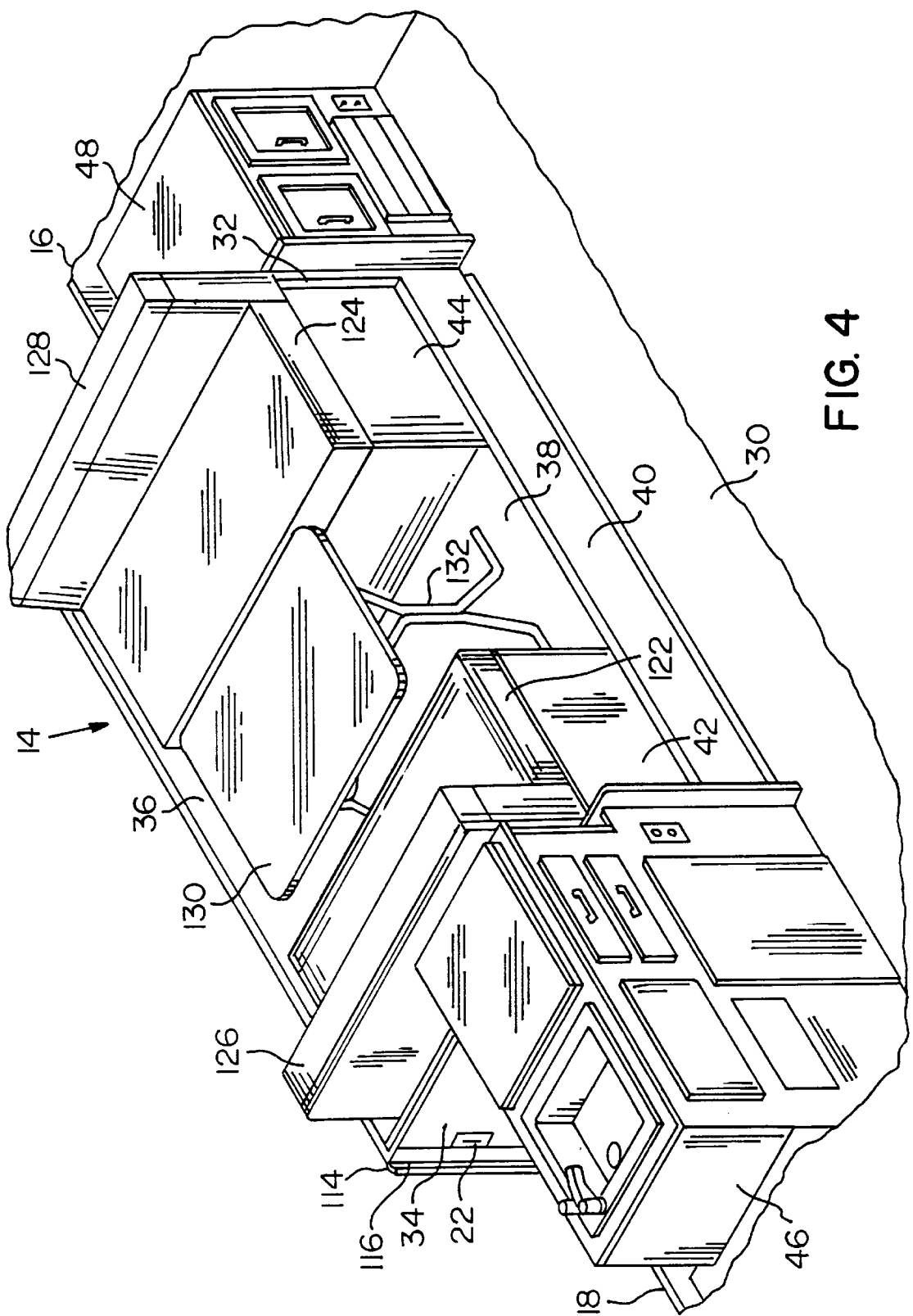
FIG. 4 is a perspective view, similar to FIG. 3, of a portion of the folding trailer shown in FIG. 1 with the slide-out in the extended position.

FIGS. 3 and 4 show the interior of the trailer shown in FIGS. 1 and 2 and the relation of the slide-out 14 to a trailer floor 30 in both the retracted position (FIG. 3) and the extended position (FIG. 4). The slide-out 14 is a box-like structure which includes a front wall 32, a rear wall 34 and an exterior wall 36, with a slide-out floor 38 attached between these three walls (32, 34, 36) and spaced above the trailer floor 30 and above a lower edge of the front wall 32 and rear wall 34. An access panel 40 is provided on an interior side of the slide-out 14 opposite the exterior wall 36 and covers the area between the trailer floor 30 and the slide-out floor 38. The arrangement shown in FIGS. 3 and 4 includes a pair of seat boxes 42, 44 attached to the upper surface of the slide-out floor 38, since this arrangement is for a dinette area, but other trailer features or structures could be provided on the slide-out floor 38. In addition, the arrangement shown in FIGS. 3 and 4 has the slide-out 14 positioned between a galley area 46 and a hutch or storage area 48 along the left side of the trailer, but other known features of a folding trailer can be provided on either side, both sides or neither side of the slide-out 14, as desired. The seat boxes 42, 44 are configured to carry seat cushions 122 and 124 and seat backs 126 and 128, respectively. In addition, a table 130 is positioned in the area between the seat boxes 42 and 44. In the arrangement shown in FIG. 3, which has the seat cushions 122, 124, seat backs 126, 128 and table 130 folded down, the table 130 is positioned in the spacing between the seat boxes 42 and 44. As shown in FIG. 4, legs 132 on the bottom of the table 130 are extended, raising the table 130 upward for use, and the seat backs 126, 128 and cushions 122, 124 are moved into their positions for normal use. When the trailer is to be folded once again, the table 130 is retracted to the position shown in FIG. 3 and the seat cushions 122, 124 and seat backs 126, 128 span the surface area provided by the top of the seat boxes 42, 44 and the top of the table 130.

Figure 5:
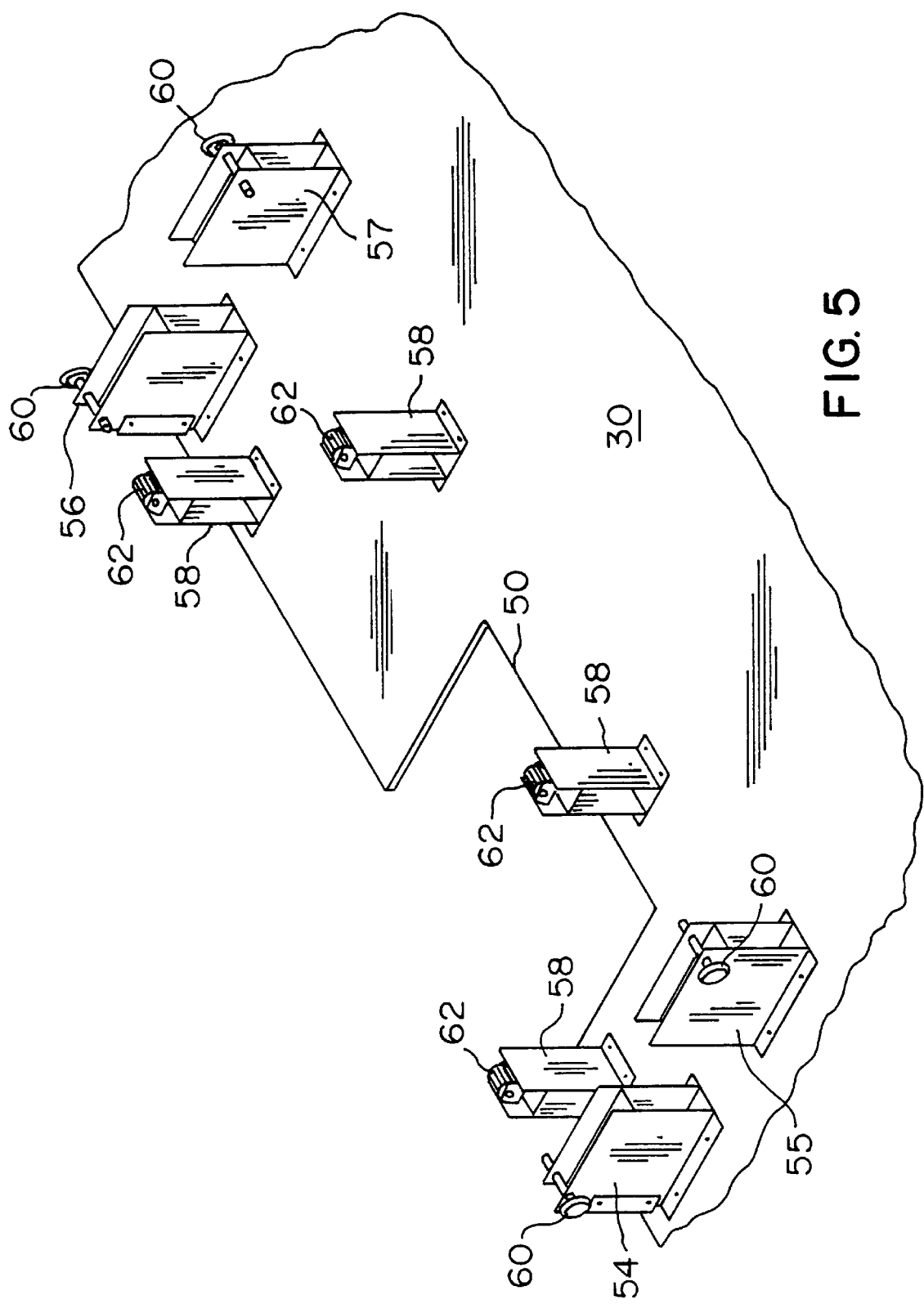
FIG. 5 is a perspective view of a portion of the folding trailer shown in FIGS. 3 and 4, with the slide-out and other elements removed.

FIG. 5 shows the trailer floor 30 with the slide-out 14 and remaining elements removed for clarity. A portion of the mechanism which supports and moves the slide-out 14 between the retracted and extended positions is shown in FIG. 5. A notch 50 shown in FIG. 5 is a cutout in the trailer floor 30 for a wheel well 74 (shown in FIGS. 7 and 8) which is covered by an arcuate-shaped member (not shown) which extends above the trailer floor 30 to accommodate a wheel located therebeneath. The mechanism for supporting the slide-out 14 and for moving the slide-out 14 laterally includes a pair of lateral roller supports 54, 55 along a first side of the slide-out 14, a pair of lateral roller supports 56, 57 on the other side of the slide-out 14, and configured in a mirror image to the lateral roller supports 54, 55 on the first side of the slide-out 14, and a plurality of vertical roller supports 58 spaced between the lateral roller supports 54–57 and generally surrounding the wheel well notch 50. The lateral roller supports 54–57 are attached to the trailer floor 30 at an upper surface thereof. The lateral roller supports 54–57 each include a lateral roller 60 extending outwardly therefrom and the vertical roller supports 58 each include a vertical roller 62 at an upper end thereof. The details of these roller supports and the rollers contained therein will be explained hereinafter in more detail.

Figure 6:
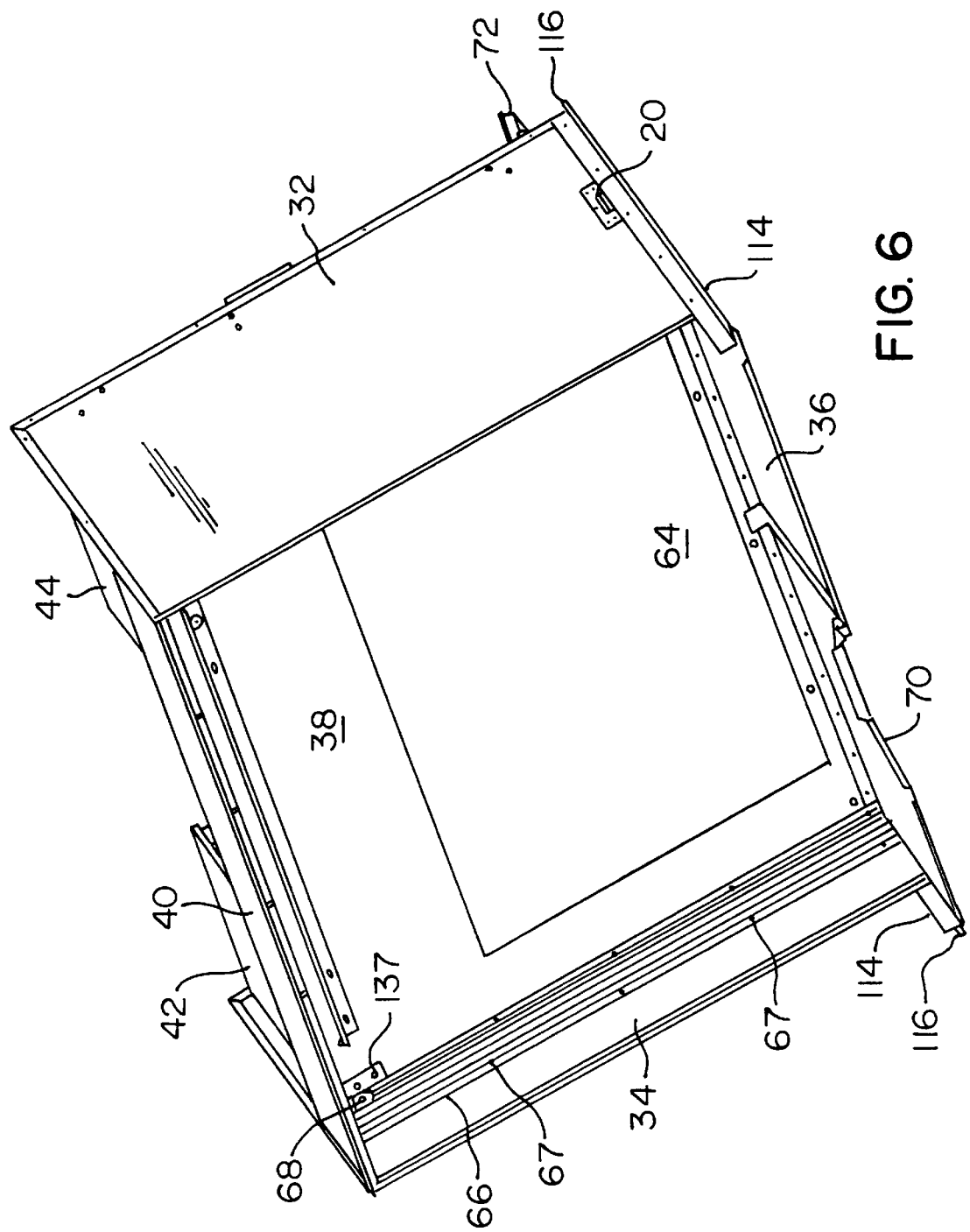
FIG. 6 is a lower perspective view of the slide-out shown in FIGS. 3 and 4.

FIG. 6 shows the various elements of the slide-out 14 itself and removed from the trailer. A lower surface of the slide-out floor 38 includes a sheet metal wear surface 64 or the like which engages the vertical rollers 62 of the vertical roller supports 58 shown in FIG. 5. The vertical rollers 62 contact and support the floor of the slide-out floor 38 and the slide-out floor 38 moves along the vertical rollers 62 in contact with the sheet metal wear surface 64. A roller track 66 is attached by bolts 67 or the like to an inner surface of each of the front wall 32 and rear wall 34 of the slide-out 14 and engages the lateral rollers 60 provided on the lateral roller supports 54–57. In addition, a catch clip 68 is attached to the lower surface of the slide-out floor 38 adjacent the access panel 40 and toward the interior of the trailer. The function of the roller track 66 and the catch clip 68 will be explained hereinafter in more detail. The exterior wall 36 of the slide-out 14 shown in FIG. 6 includes a notched area 70 for access to the trailer wheel. The exterior wall 36 of the slide-out 14 extends downwardly below the front wall 32 and rear wall 34 to match a body panel on the exterior of the trailer body 2. This is shown more clearly in FIGS. 1 and 2. FIG. 6 shows a portion of the mechanism for latch 20 discussed above. In addition, a body rail 72 extends along a top surface of the slide-out 14 adjacent the exterior wall 36.

Figure 7:
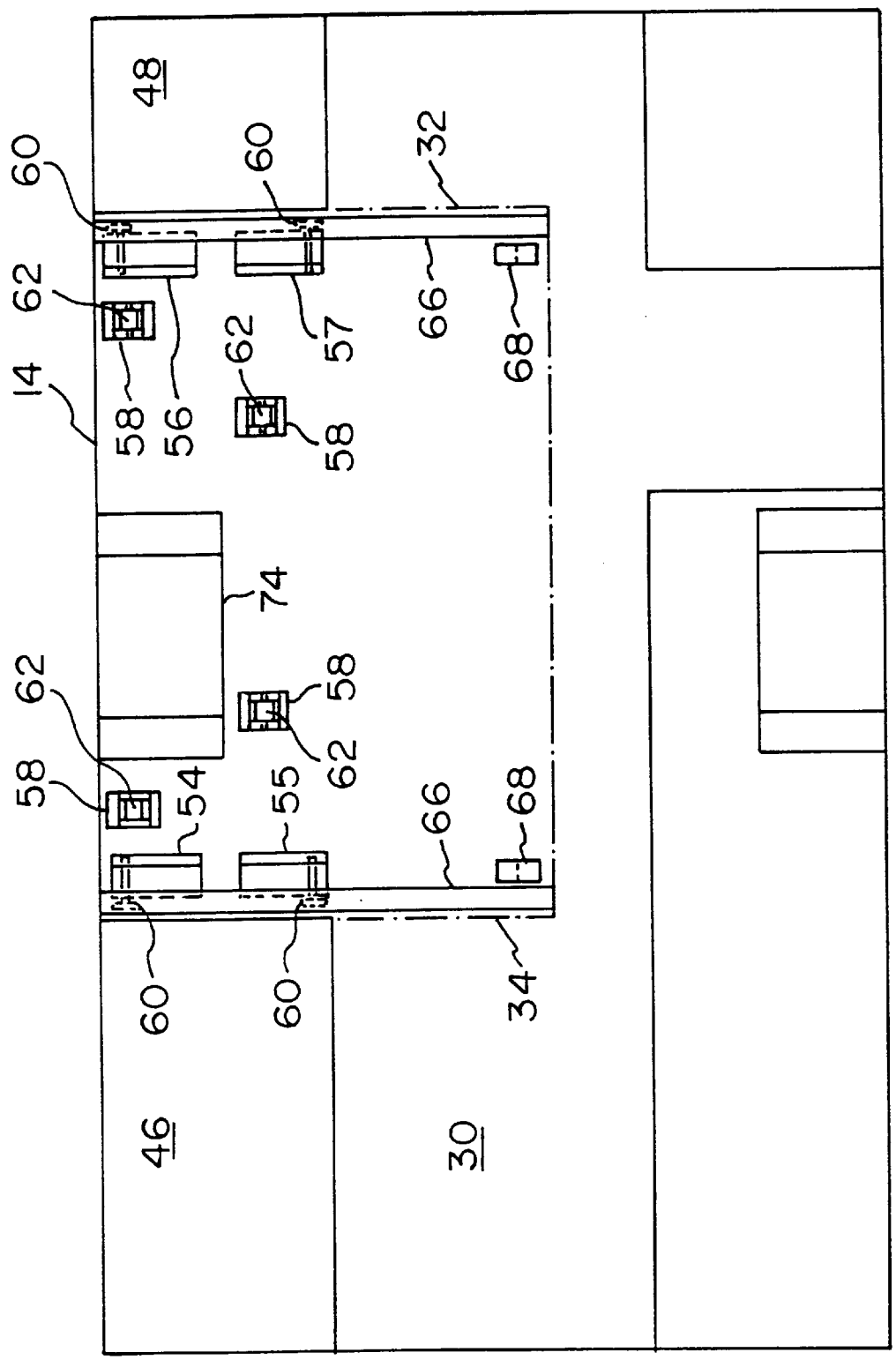
FIG. 7 is a schematic top plan view of the folding trailer shown in FIGS. 1–5 with the slide-out in the retracted position.
Figure 8:
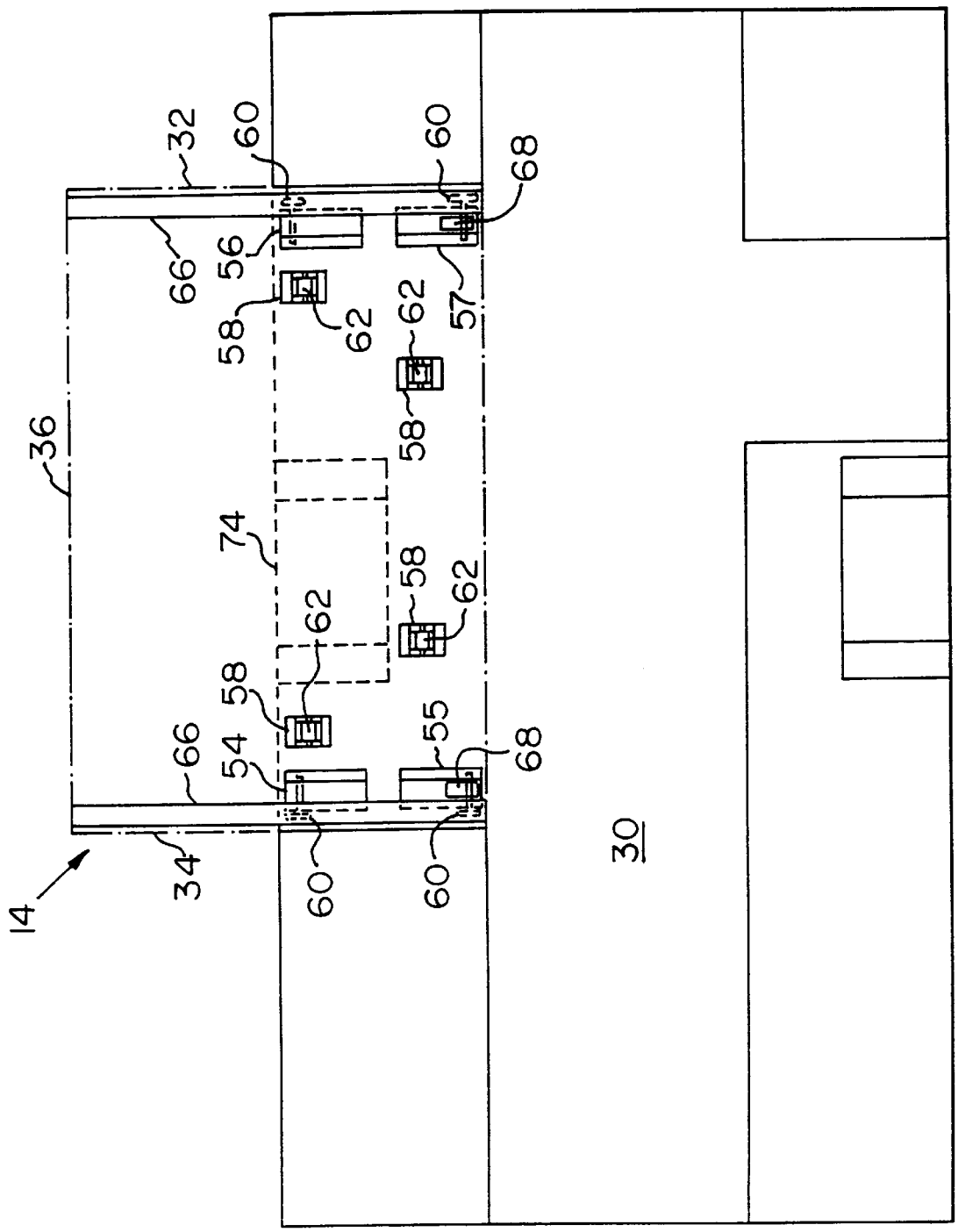
FIG. 8 is a schematic top plan view, similar to FIG. 7, of the folding trailer shown in FIGS. 1–5 with the slide-out in the extended position.

FIGS. 7 and 8 show the slide-out 14, in phantom, in relationship to the remaining elements of the trailer. FIG. 7 shows the slide-out 14 in the retracted position and FIG. 8 shows the slide-out 14 in the extended position. Lateral roller supports 54 and 56 are positioned along the sides of the slide-out 14 and adjacent the outer edge of the trailer floor 30. Lateral roller supports 55 and 57 are positioned on the trailer floor 30 so that they are adjacent the access panel 40 when the slide-out 14 is in the fully extended position shown in FIG. 8. The lateral rollers 60 in the lateral roller supports 54–57 engage the roller tracks 66 and the slide-out 14 rides along these lateral rollers 60 through movement of the roller track therealong. FIGS. 7 and 8 show how the support mechanism for the slide-out 14 remains contained within the slide-out 14 and is not visible when the slide-out 14 is either in the retracted position, shown in FIG. 7, or in the extended position, shown in FIG. 8. In addition, FIG. 8 shows the increase in usable floor space in the interior of the trailer when the slide-out 14 is in the extended position. Moreover, FIGS. 7 and 8 show how the support mechanism for the slide-out 14 is positioned in the area surrounding the wheel well 74 of the trailer. By this arrangement, the lateral roller supports 54–57 and vertical roller supports 58 can be positioned to accommodate the location of the wheel well 74 or other elements in an existing trailer without the need for a major redesign of the overall trailer for inclusion of the slide-out 14.

FIG. 9 shows the details of one of the lateral roller supports 54–57 discussed above. Each lateral roller support 54–57 includes a pair of spaced vertical side walls 76, 77, a base 78 attached thereto at a lower end of the side walls 76, 77, and an interior strut 79 providing strength and rigidity to the overall structure. The base 78 has flanges 80, 81 which flare outwardly from the side walls 76, 77 and include a plurality of attachment holes 82 therethrough for attaching the lateral roller supports 5457 to the trailer floor 30. A roller wheel 83 attached to one end of a horizontally oriented shaft 84, and forming the lateral roller 60, is rotatably attached to an upper portion of the side walls 76, 77 at one end thereof. While the roller wheel 83/shaft 84 is referred to for convenience as the "lateral" roller 60, it can be appreciated from the drawings that the roller wheel 83 itself is oriented in a vertical direction with respect to the shaft 84. However, this orientation of the roller wheel 83 permits the roller track 66 to move therealong in a lateral direction.

FIGS. 10 and 11 show the details of the vertical roller support 58 discussed above. Similar to the lateral roller support, the vertical roller support 58 includes a pair of spaced side walls 86, 87 attached at a lower end thereof to a base 88 having flanged areas 89, 90 extending outwardly therefrom and having a plurality of attachment holes 91 therethrough. A strut 92 positioned between and attached to the side walls 86, 87 near an upper end thereof provides a support for a U-shaped saddle member 93 holding a vertical roller 62 rotatably mounted therein. A threaded shaft 94 extends downwardly from a lower surface of the saddle 93 and is attached to the strut 92 by a pair of nuts 95, 96 or the like. By this arrangement, the vertical height of the saddle 93 and, hence, the vertical height or location of the vertical roller 62, can be adjusted so that the vertical roller 62 can be positioned at an optimal height to contact the lower surface of the slide-out floor 38. Moreover, the height of the slide-out floor 38 is selected to clear the height of the wheel well 74 located beneath the slide-out 14. While the roller 62 is referred to as a "vertical" roller, since it is attached to the vertical roller support 58, it can be appreciated from the drawings that the cylindrically shaped vertical roller 62 rotates about a horizontal axis passing therethrough and permits horizontal movement of the slide-out 14 thereover. Other arrangements for the vertical roller 62 can be provided, such as a ball shaped roller or a wheel shaped roller.

Figure 12:
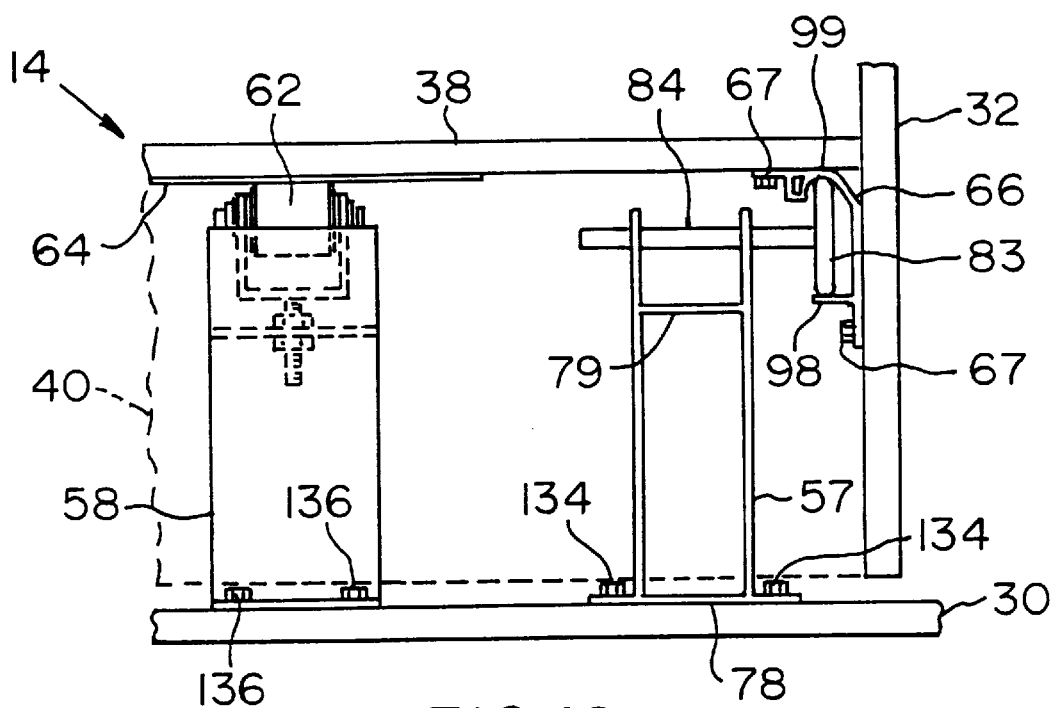
FIG. 12 is a side view of the inside, right-hand corner of the slide-out shown in FIGS. 3 and 4, with the access panel in phantom.

FIG. 12 shows the particulars regarding the arrangement of the lateral roller supports 54–57 and the vertical roller support 58 in relationship to the elements of the slide-out 14. In particular, FIG. 12 shows the lateral roller support 57 mounted by bolts 134 to the trailer floor 30 and with its roller wheel 83 positioned within the roller track 66 which is attached to the inner surface of the front wall 32 of the slide-out 14 and is also attached to the lower surface of the slide-out floor 38. The roller wheels 83 ride along a flat lower member 98 of the roller track 66 and is held in place by a curved upper member 99 thereof. The vertical roller 62, mounted to the trailer floor 30 by bolts 136, contacts the lower surface of the slide-out floor 38, preferably in contact with the metal wear surface 64 placed thereon. A similar construction is provided with the lateral roller support 56 at the other end of the front wall 32 of the slide-out 14 as well as with the lateral roller supports 54 and 55 at the other side of the slide-out 14 along its rear wall 34. The access panel 40 is shown in phantom to illustrate the clearance between the bottom of the slide-out 14 and the top of the trailer floor 30.

Figure 13:
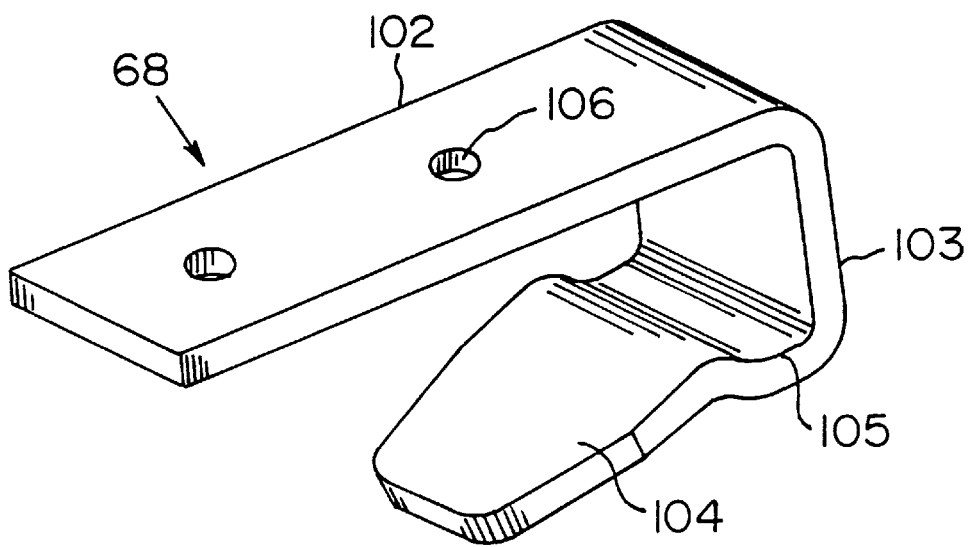
FIG. 13 is a perspective view of the catch clip shown in FIGS. 6 and 7.
Figure 14:
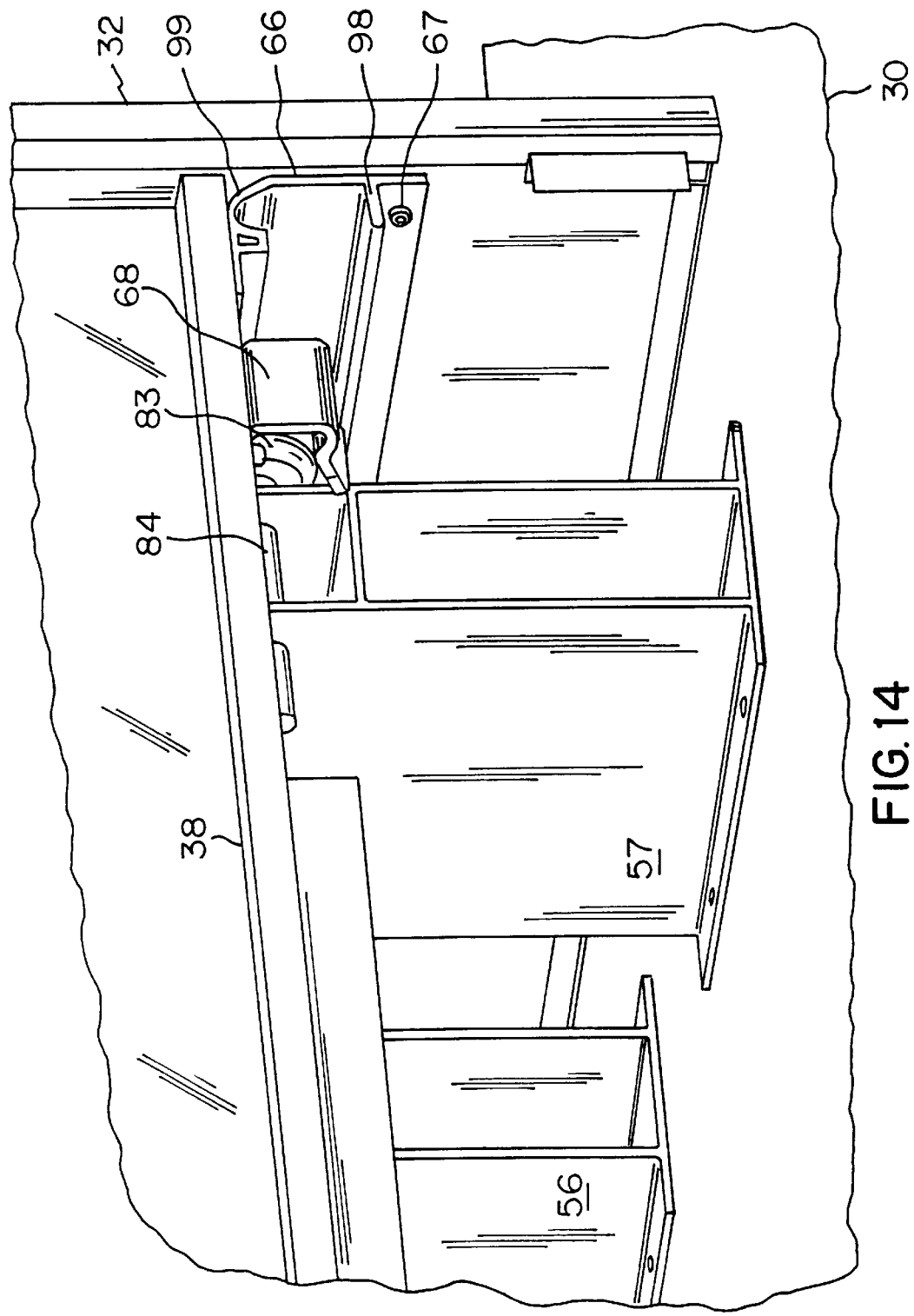
FIG. 14 is a perspective view of the corner of the slide-out shown in FIG. 12 and with the slide-out being extended.

The slide-out catch clip 68 is shown in more detail in FIG. 13. The catch clip 68 is a J-shaped member having a flat support plate 102 and a hook portion 103 extending downwardly therefrom. The hook portion 103 slopes upwardly along a front, angled portion 104 and then downwardly into a rear, trough portion 105. Mounting holes 106 are provided in the support plate 102 in order to mount the catch clip 68, via appropriate bolts 137, of the slide-out floor 38 as shown in FIG. 6.

Figure 15:
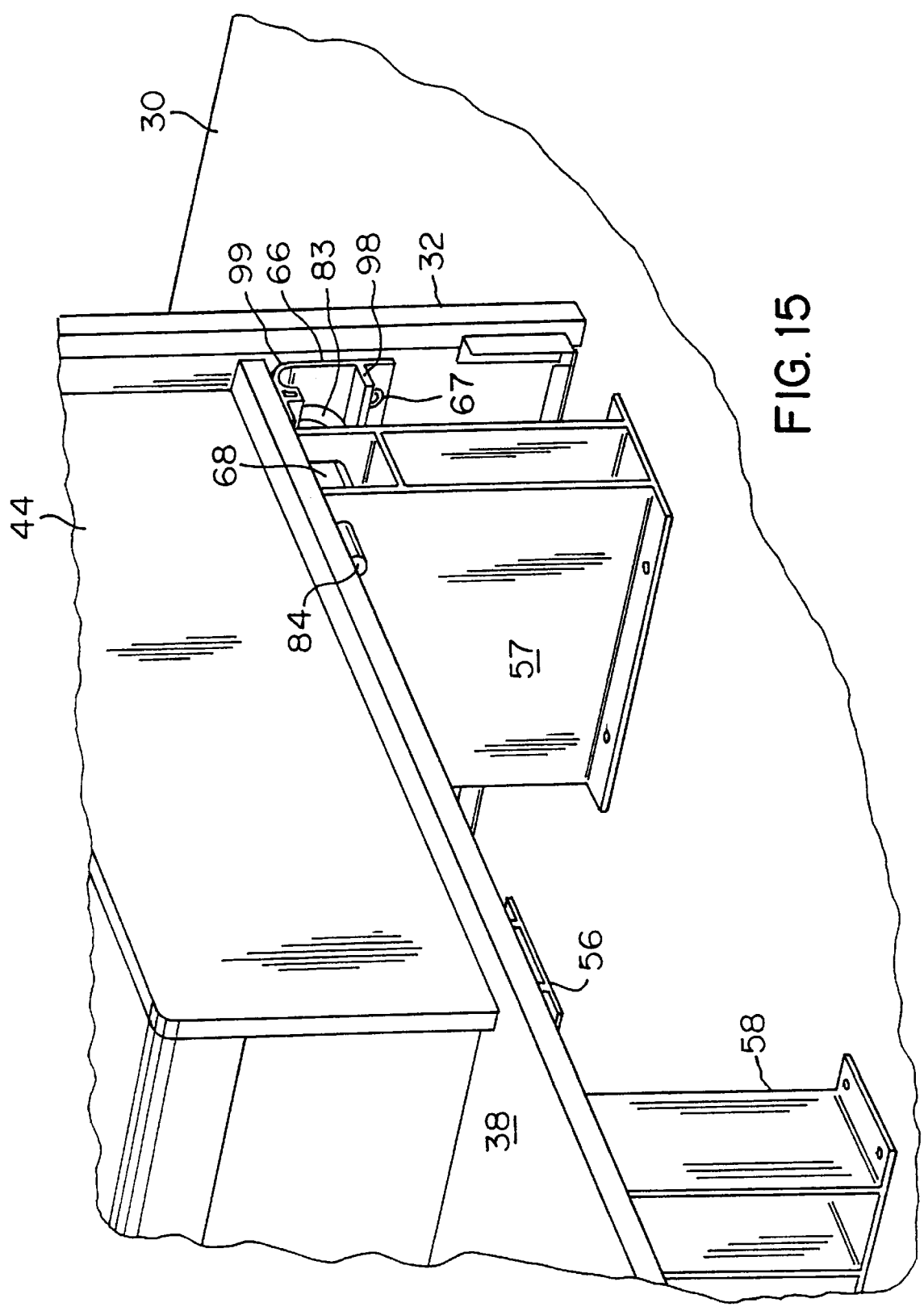
FIG. 15 is a perspective view, similar to FIG. 14, of the corner of the slide-out shown in FIG. 12 and with the slide-out in the fully extended position.
Figure 16:
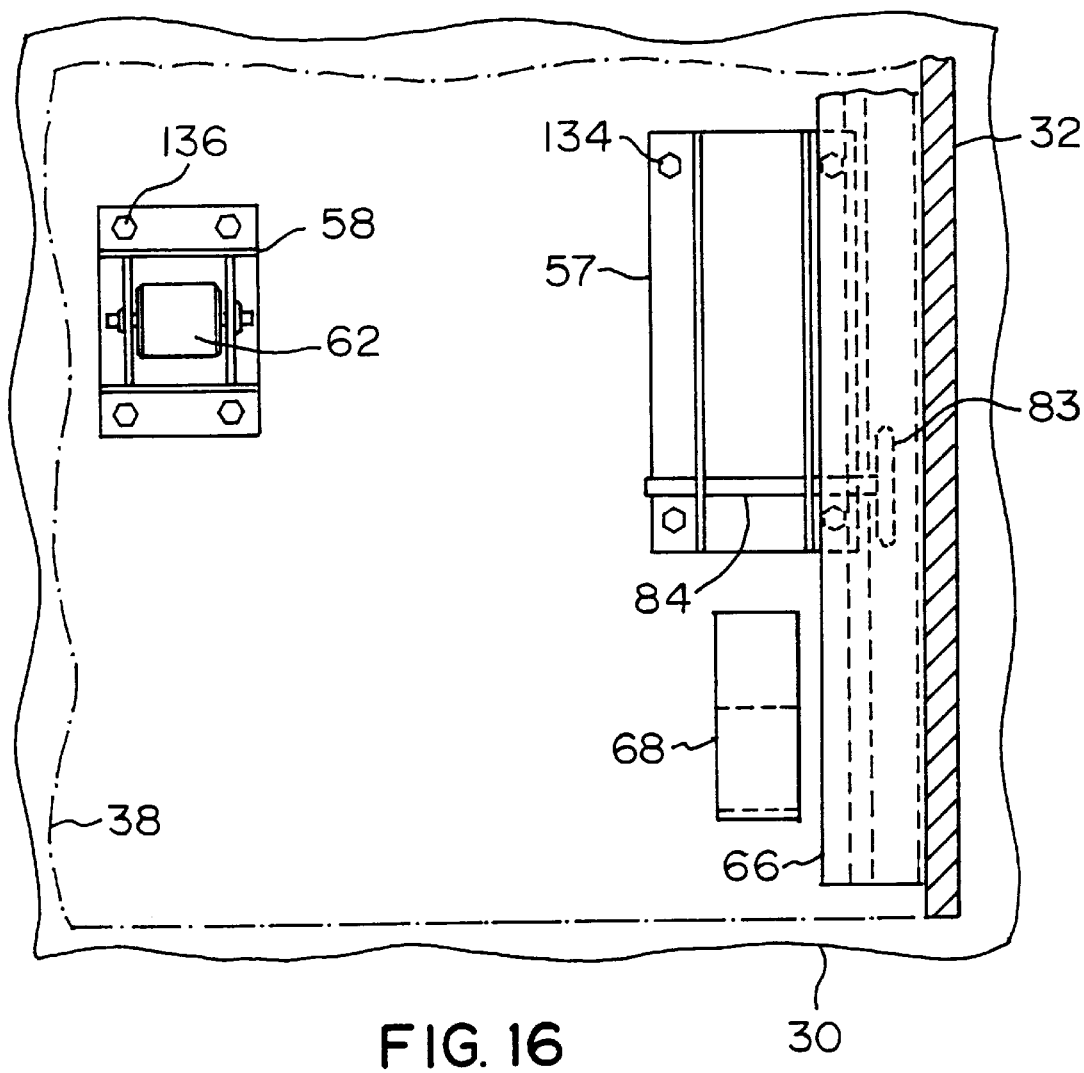
FIG. 16 is a top plan view of the portion of the slide-out shown in FIG. 14.
Figure 17:
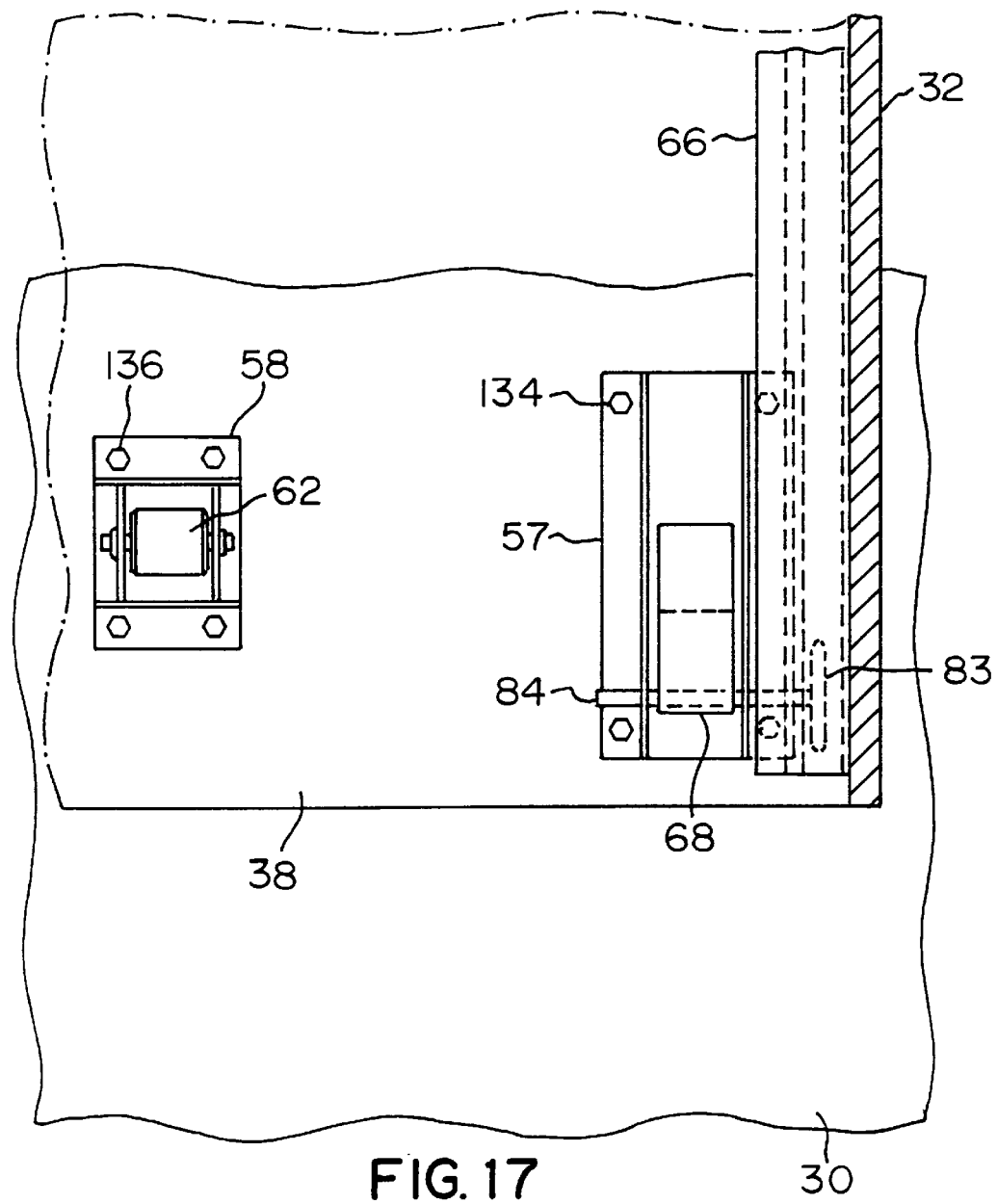
FIG. 17 is a top plan view of the portion of the slide-out shown in FIG. 15.

FIGS. 14–19 show how the catch clip 68 engages the shaft 84 of the lateral roller 60 associated with the inner lateral roller support 57 adjacent the front wall 32 and access panel 40 of the slide-out 14. A similar catch clip mechanism is provided at the other inner lateral roller support 55 adjacent the rear wall 34 and access panel 40 of the slide-out 14 as shown in other figures. FIGS. 14–19 show how the slide-out 14, through the roller tracks 66, rides along the lateral roller supports 54–57 and how the slide-out floor 38 rides along the vertical roller supports 58. No catch clip mechanism is provided adjacent the remaining or outer lateral roller supports 54 and 56 as it is not necessary. Inward motion of the slide-out 14 is stopped by a flange or the exterior wall 36 of the slide-out 14 itself engaging the trailer as discussed hereinafter. The outward movement of the slide-out 14 is stopped in its motion by catch clips 68 engaging the shafts 84 of the lateral rollers 60 associated with the inner lateral roller supports 55 and 57. As the slide-out 14 is being moved to its fully extended position, the catch clip 68 is moved close to the shaft 84 as shown in more detail in FIGS. 14, 16 and 18. Further outward movement of the slide-out 14 causes the catch clip 68 to engage the shaft 84 of the lateral roller 60 and the angled portion 104 of the catch clip 68 rides along the shaft 84 and lifts the slide-out 14 upwardly slightly and further away from the trailer floor 30. Further outward movement of the slide-out 14 causes the catch clip 68 to continue to ride along the shaft 84 until the shaft 84 drops into the trough portion 105 and then abuts the back of the hook portion 103 of the catch clip 68, which stops further outward motion of the slide-out 14. At this point, the slide-out 14 is in its fully extended position, as shown in FIGS. 15, 17 and 19. If sufficient outward force is imparted to the slide-out 14, then the momentum will carry the catch clip 68 along the shaft 84. Otherwise, a user may need to lift upward slightly on the slide-out when the catch clip 68 engages the shaft 84.

Since the shaft 84 of the lateral roller 60 is placed in the trough portion 105 of the catch clip 68, the slide-out 14 cannot move inwardly to its retracted position without a certain amount of force being exerted on the slide-out 14. This force will cause the shaft 84 to move out of the trough portion 105 and down the angled portion 104 of the catch clip 68. By providing this initial force, the slide-out 14 can be moved back to its retracted position in a relatively easy manner. A user may need to lift the slide-out 14 upward slightly when closing the slide-out in order to move the shaft 84 from the trough portion 105.

Providing the catch clip 68 with this configuration lets a user know when the slide-out 14 is in its fully extended position because the shaft 84 of the lateral roller 60 will actually drop into the trough portion 105 in a manner which is readily detectable by a user. Moreover, the slide-out 14 will not accidentally be moved into the retracted position because a definite inward force is needed to move the catch clip 68 out of engagement with the shaft 84. Furthermore, the engagement and disengagement of the catch clips 68 occurs automatically and continuously as the slide-out 14 is pulled from and pushed back into the trailer body 2. No locking pins or other additional devices, requiring separate operation, are used to lock the slide-out 14 in its extended position or must be disengaged before the slide-out 14 can be retracted back into the trailer body 2.

Figure 20:
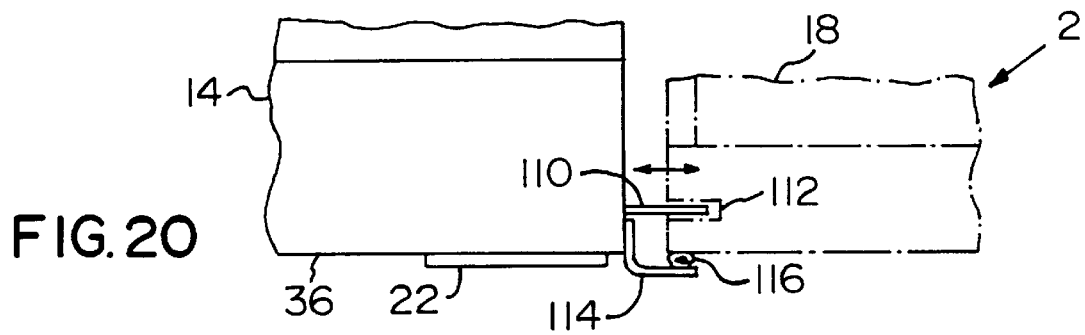
FIG. 20 is a top plan view of a portion of the folding trailer shown in FIGS. 1 and 2, showing how the slide-out is attached to the trailer body.
Figure 21:
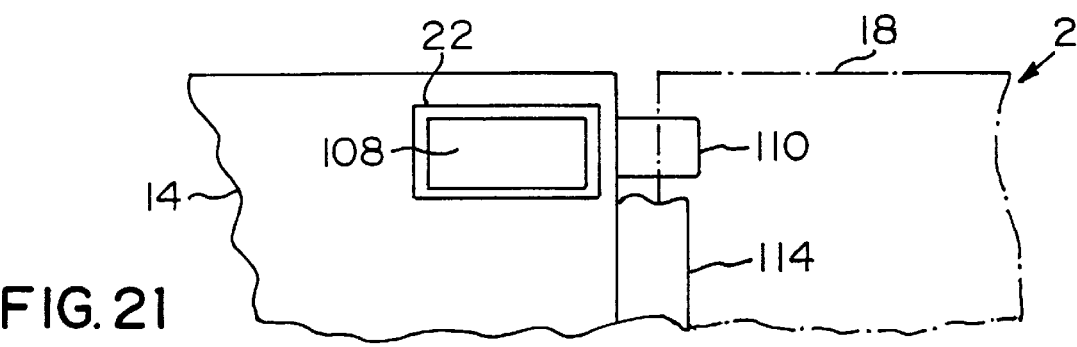
FIG. 21 is a front view of the portion of the folding trailer shown in FIG. 20.
Figure 22:
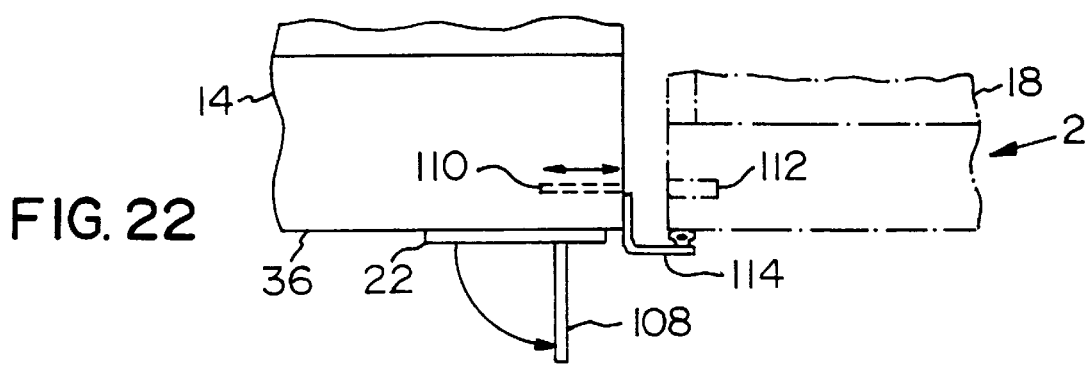
FIG. 22 is a top plan view, similar to FIG. 20, showing how the slide-out is released from the trailer body, and permitting the slide-out to be extended from the trailer body.
Figure 23:
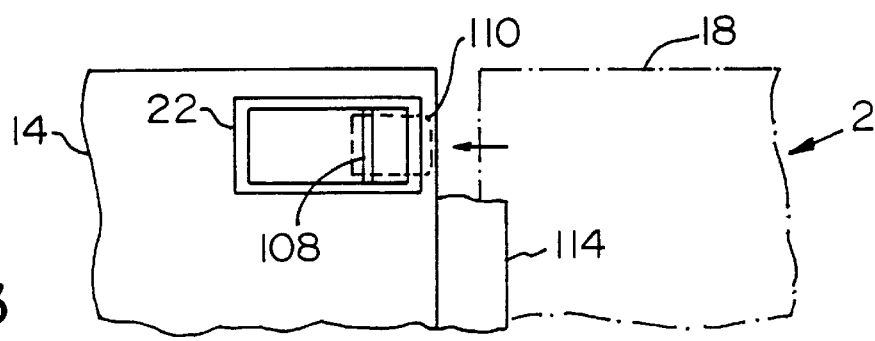
FIG. 23 is a front view of the portion of the folding trailer shown in FIG. 22.

The manner of locking the slide-out 14 to the trailer body 2 in the retracted position and releasing the slide-out 14 from the trailer body 2 for movement to the extended position is shown in FIGS. 20–23. As discussed above, the slide-out 14 has a latch on each side thereof. Latch 22 is shown in FIGS. 20–23 and has a handle 108 actuating a latching pin 110 which engages a slot 112 in the trailer body 2 adjacent thereto. Movement of the latch handle 108 moves the latching pin 110 between a locked position in engagement with the slot 112 (FIGS. 20 and 21), locking the slide-out 14 to the trailer body 2, and a released position withdrawn from the slot 112 (FIGS. 22 and 23), which permits the slide-out 14 to be withdrawn from the trailer body 2 as discussed above. FIGS. 20–23 also illustrate a vertical flange 114 mounted along the edge of the slide-out 14 adjacent the trailer body 2. Movement of the slide-out 14 into the trailer is stopped when the flange 114 abuts the trailer body 2, as shown in FIGS. 20 and 22, at which point the latch handle 108 is moved from the opened position (FIG. 22) to the closed position (FIG. 20) which moves the latching pin 110 into locking engagement with the slot 112. While FIGS. 20–23 show the area of the slide-out 14 adjacent the rear part 18 of the left side wall of the trailer body 2, a similar latch and flange arrangement is included in the area of the slide-out 14 adjacent the front part 16 of the left side wall of the trailer body 2 in connection with latch 20. The sealing of the slide-out 14 to the trailer body 2 is shown in FIGS. 20, 22, 24 and 25. An elongated, resilient weather strip 116 is provided on the inner surface of the vertical flange 114 where the flange 114 abuts the trailer body 2 when the slide-out 14 is in the retracted position.

Figure 24:
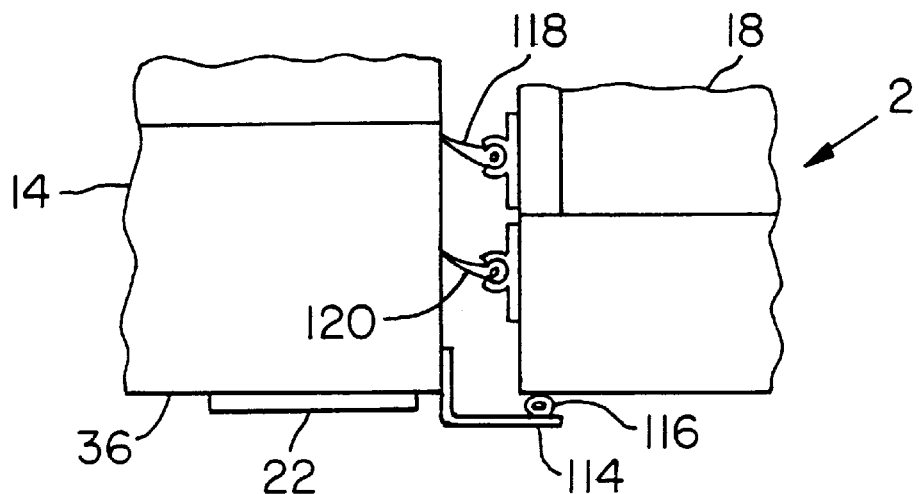
FIG. 24 is a top plan view, similar to FIG. 20, showing weather stripping extending between the trailer body and the slide-out, and in the retracted position.
Figure 25:
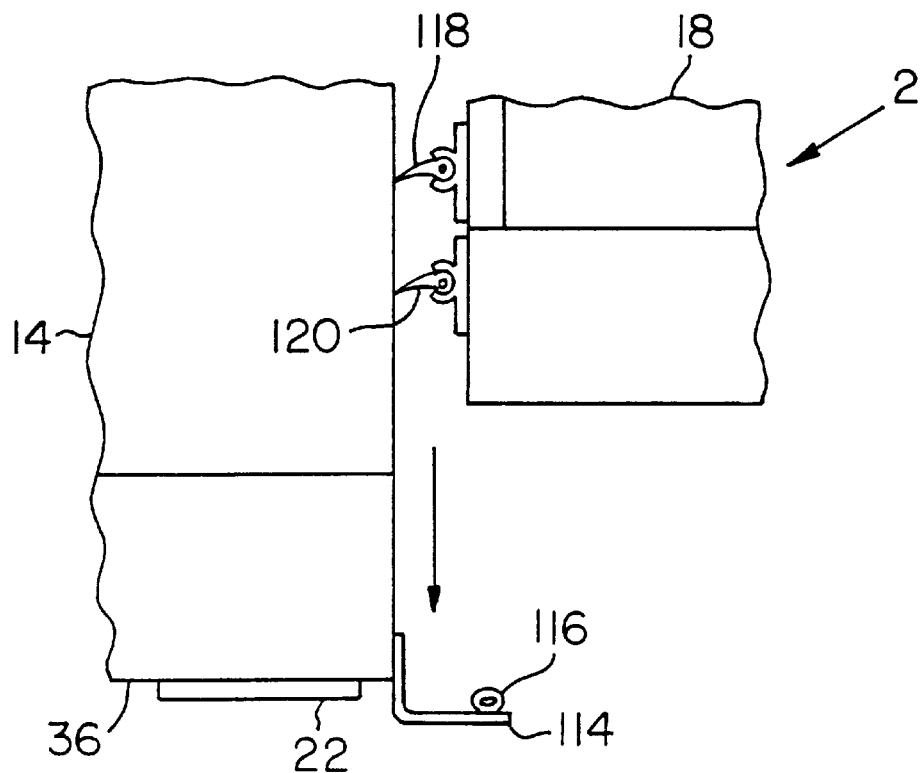
FIG. 25 is a top plan view, similar to FIG. 24, showing the slide-out being extended from the trailer body.

One or more vertical weather strips 118, 120 are attached to the trailer body 2 in the areas where the slide-out 14 moves into and out of the trailer. The weather strips 118, 120 are preferably angled downwardly and outwardly so that any water that does contact the weather strips 118, 120 is directed away from the interior of the trailer. While FIGS. 24 and 25 show weather strips 116, 118 and 120 adjacent the rear part 18 of the left side wall of the trailer body 2, similar weather strips are provided on the other side of the slide-out 14 and adjacent the front part 16 of the left side wall of the trailer floor 30.

The folding trailer with an extendable or slide-out room as discussed above is easy to operate and solves many problems when compared to prior designs. No portion of the slide mechanism connecting the extendable room to the trailer body extends below the trailer floor or is exposed to potential damage from road hazards, rocks or the like. The design does not require stabilizers to support the extendable room, due to the cantilever effect of the roller track/lateral roller support construction, so bending of the slide mechanism from uneven stabilization is not a concern. No portion of the slide mechanism requires lubrication, thus avoiding maintenance in the future and avoiding the possibility of failure of the slide mechanism due to the build-up of dirt and the like on any lubricated moving parts. Furthermore, the slide mechanism supports the extendable room completely above and out of contact with the trailer floor at all times, which eliminates the damaging effect from the extendable room rolling along or sitting on the trailer floor. In addition, the slide mechanism of the present design requires only a small amount of force to extend and retract the extendable room, and automatically locks the extendable room in the extended position.

Having described above the presently preferred embodiments of the present invention, it is to be understood that the invention may be otherwise embodied within the scope of the appended claims.

We claim:

1. A folding trailer with an extendable room, the folding trailer comprising:
   a) a trailer body supported by a framework and having a floor therein,
   b) a roof aligned above the trailer body and movable between a closed position adjacent the trailer body and an opened position raised above the trailer body,
   c) an extendable room positioned above and spaced from the trailer floor and movable between a closed position retracted within the trailer body and an opened position extended outwardly beyond the trailer body, with the extendable room including a floor spaced above the trailer floor,
   d) a flexible enclosure extending between the raised roof, the trailer body and the extendable room and forming an enclosed trailer space with the roof, the trailer body and the extendable room, and
   e) a slide mechanism which slidably attaches the extendable room to the trailer body, with the slide mechanism including a track mechanism attached to one of the trailer floor and the extendable room and extending along a direction of movement of the extendable room and a roller mechanism attached to the other of the trailer floor and the extendable room and engaging the track mechanism, with the slide mechanism located on or beneath the floor of the extendable room and on or above the trailer floor when the extendable room is in both the closed and opened positions, and with no portion of the slide mechanism extending beyond the extendable room and into an interior area of the trailer body when the extendable room is in both the closed and opened positions.

2. The folding trailer of claim 1 wherein the extendable room includes a front wall, a rear wall and an exterior wall forming a box-like structure, with the floor of the extendable room attached thereto, and with the slide mechanism located on or between the front wall, the rear wall and floor of the extendable room.

3. The folding trailer of claim 2 wherein the track mechanism includes a first roller track on an inside surface of the front wall and a second roller track on an inside surface of the rear wall, with the first and second roller tracks located below the extendable room floor, and wherein the roller mechanism includes at least one lateral roller support attached to the trailer floor adjacent the first roller track and having a lateral roller which engages the first roller track and at least one lateral roller support attached to the trailer floor adjacent the second roller track and having a lateral roller which engages the second roller track.

4. The folding trailer of claim 2 wherein the track mechanism includes a first roller track on an inside surface of the front wall and a second roller track on an inside surface of the rear wall, with the first and second roller tracks located below the extendable room floor, and wherein the roller mechanism includes at least two lateral roller supports attached to the trailer floor adjacent the first roller track and each having a lateral roller which engages the first roller track and at least two lateral roller supports attached to the trailer floor adjacent the second roller track and each having a lateral roller which engages the second roller track.

5. The folding trailer of claim 4 wherein the lateral roller supports each have an upstanding body attached to the trailer floor, a horizontally disposed shaft rotatably attached to the body and a roller wheel attached to an end of the shaft and engaging an adjacent roller track.

6. The folding trailer of claim 5 wherein the lateral support body includes a base, a pair of spaced side walls attached thereto and extending upwardly therefrom, and a strut spaced above the base and extending between the side walls, with the shaft of the roller wheel extending through the side walls and above the strut.

7. The folding trailer of claim 4 further including a plurality of vertical roller supports attached to the trailer floor and positioned beneath the floor of the extendable room and within the front and rear walls of the extendable room, and positioned with that portion of the trailer floor which is beneath the floor of the extendable room when it is in the opened position, with the vertical roller supports each including a vertical roller which contacts and supports a lower surface of the floor of the extendable room.

8. The folding trailer of claim 7 further including a wear member attached to the lower surface of the floor of the extendable room, at least in the areas contacted by the vertical rollers of the vertical roller supports.

9. The folding trailer of claim 7 wherein each vertical roller support includes an adjustment mechanism for adjusting the vertical position of the vertical roller.

10. The folding trailer of claim 9 wherein each vertical roller support includes a base attached to the trailer floor, a pair of spaced side walls attached thereto and extending upwardly therefrom, and a strut spaced above the base and extending between the side walls, with the vertical roller rotatably attached to a support bracket which is attached to the strut.

11. The folding trailer of claim 10 wherein the adjustment mechanism includes a threaded shaft attached to a lower surface of the support bracket and extending through the strut and nut means for locking the threaded shaft to the strut at a desired location such that the vertical roller contacts the lower surface of the floor of the extendable room.

12. The folding trailer of claim 1 further including at least one releasable latch mechanism which locks the extendable room to the trailer body in the closed position and which can be released to permit the extendable room to be withdrawn from the folding trailer and to the opened position.

13. The folding trailer of claim 4 further including at least one catch clip attached to a lower surface of the floor of the extendable room and adjacent an interior edge opposite the exterior wall and configured to engage an adjacent one of the lateral roller supports and stop the outward movement of the extendable room when it is moved from the closed position to the opened position.

14. The folding trailer of claim 5 further including a pair of catch clips attached to a lower surface of the floor of the extendable room and adjacent an interior edge opposite the exterior wall, with a first of the catch clips positioned adjacent the first roller track and aligned with the innermost of the lateral roller supports adjacent the first roller track, and with a second of the catch clips positioned adjacent the second roller track and aligned with the innermost of the lateral roller supports adjacent the second roller track, and with each catch clip configured to engage an adjacent lateral roller support and stop the outward movement of the extendable room when it is moved from the closed position to the opened position.

15. The folding trailer of claim 14 wherein each catch clip is a J-shaped member having a support plate attached to the floor of the extendable room and a hook portion extending downwardly therefrom, with the hook portion including a front portion spaced from the support plate and angled upwardly to a trough portion, attached to the support plate, with the trough portion sloping downwardly from the front portion, such that the front portion of the catch clip engages the shaft of the adjacent lateral roller support as the extendable room is nearly fully extended and such that the shaft drops into the trough portion when the extendable room is fully extended.

16. The folding trailer of claim 1 further including at least one flange on the extendable room which contacts the trailer body and limits inward movement of the extendable room.

17. A folding trailer towable by a vehicle in a longitudinal direction, the folding trailer comprising:
   a) a trailer body supported by a framework and having a floor therein,
   b) a roof aligned above the trailer body and movable between a closed position adjacent the trailer body and an opened position raised above the trailer body,
   c) at least one extendable bed slidably connected to the trailer body and longitudinally extendable from a closed position retracted within the trailer body to an opened position extended longitudinally beyond the trailer body,
   d) a lateral slide-out room positioned above and spaced from the trailer floor and movable between a closed position retracted within the trailer body and an opened position extended laterally outwardly beyond the trailer body, with the slide-out room including a front wall, a rear wall and an exterior wall forming a box-like structure and a floor attached thereto and spaced above the trailer floor,
   e) a flexible enclosure extending between the raised roof, the trailer body and the extendable bed and the slide-out room and forming an enclosed trailer space with the roof, the trailer body and the extendable bed and the slide-out room, and
   f) a slide mechanism which slidably attaches the slide-out room to the trailer body, with the slide mechanism including a track mechanism attached to one of the trailer floor and the slide-out room and extending in a lateral direction and a roller mechanism attached to the other of the trailer floor and the slide-out room and engaging the track mechanism, with the slide mechanism located on or between the front wall, the rear wall and the floor of the slide-out room and on or above the trailer floor when the slide-out room is in both the closed and opened positions, and with no portion of the slide mechanism extending beyond the slide-out room and into an interior area of the trailer body when the slide-out room is in both the closed and opened positions.

18. The folding trailer of claim 17 wherein the track mechanism includes a first roller track on an inside surface of the front wall and a second roller track on an inside surface of the rear wall, with the first and second roller tracks located below the slide-out room floor, and wherein the roller mechanism includes at least two lateral roller supports attached to the trailer floor adjacent the first roller track and each having a lateral roller which engages the first roller track and at least two lateral roller supports attached to the trailer floor adjacent the second roller track and each having a lateral roller which engages the second roller track.

19. The folding trailer of claim 18 further including a plurality of vertical roller supports attached to the trailer floor and positioned beneath the floor of the slide-out room and within the front and rear walls of the slide-out room, and positioned with that portion of the trailer floor which is beneath the floor of the slide-out room when it is in the opened position, with the vertical roller supports each including a vertical roller which contacts and supports a lower surface of the floor of the slide-out room.

20. The folding trailer of claim 17 further including at least one catch clip attached to a lower surface of the floor of the slide-out room and adjacent an interior edge opposite the exterior wall and configured to engage an adjacent one of the lateral roller supports and stop the outward movement of the slide-out room when it is moved from the closed position to the opened position.

21. A folding trailer towable by a vehicle in a longitudinal direction, the folding trailer comprising:
   a) a trailer body supported by a framework and having a floor therein,
   b) a roof aligned above the trailer body and movable between a closed position adjacent the trailer body and an opened position raised above the trailer body,
   c) at least one extendable bed slidably connected to the trailer body and longitudinally extendable from a closed position retracted within the trailer body to an opened position extended longitudinally beyond the trailer body,
   d) a lateral slide-out room positioned above and spaced from the trailer floor and movable between a closed position retracted within the trailer body and an opened position extended laterally outwardly beyond the trailer body, with the slide-out room including a front wall, a rear wall and an exterior wall forming a box-like structure and a floor attached thereto and spaced above a lower end of the front wall and the rear wall, e) a flexible enclosure extending between the raised roof, the trailer body and the extendable bed and the slide-out room and forming an enclosed trailer space with the roof, the trailer body and the extendable bed and the slide-out room, and f) a slide mechanism which slidably attaches the slide-out room to the trailer body, with the slide mechanism including a first roller track on an inside surface of the front wall and a second roller track on an inside surface of the rear wall, with the first and second roller tracks located below the slide-out room floor, and with the slide mechanism including at least two lateral roller supports attached to the trailer floor adjacent the first roller track and each having a lateral roller which engages the first roller track and at least two lateral roller supports attached to the trailer floor adjacent the second roller track and each having a lateral roller which engages the second roller track, with the slide mechanism located on or between the front wall, the rear wall and the floor of the slide-out room and on or above the trailer floor when the slide-out room is in both the closed and opened positions, and with no portion of the slide mechanism extending beyond the slide-out room and into an interior area of the trailer body when the slide-out room is in both the closed and opened positions, g) a plurality of vertical roller supports attached to the trailer floor and positioned beneath the floor of the slide-out room and within the front and rear walls of the slide-out room, and positioned with that portion of the trailer floor which is beneath the floor of the slide-out room when it is in the opened position, with the vertical roller supports each including a vertical roller which contacts and supports a lower surface of the floor of the slide-out room, and h) a pair of catch clips attached to a lower surface of the floor of the slide-out room and adjacent an interior edge opposite the exterior wall and configured to engage an adjacent one of the lateral roller supports and stop the outward movement of the slide-out room when it is moved from the closed position to the opened position.

* * * * *